(12) United States Patent
Van Der Schaar

(10) Patent No.: US 6,904,092 B2
(45) Date of Patent: Jun. 7, 2005

(54) MINIMIZING DRIFT IN MOTION-COMPENSATION FINE GRANULAR SCALABLE STRUCTURES

(75) Inventor: Mihaela Van Der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 662 days.

(21) Appl. No.: 10/081,909

(22) Filed: Feb. 21, 2002

(65) Prior Publication Data

US 2003/0156638 A1 Aug. 21, 2003

(51) Int. Cl.$^7$ ................................................ H04N 7/12
(52) U.S. Cl. .................................................. 375/240.1
(58) Field of Search ...................... 375/240.01, 240.08, 375/240.1, 240.12, 240.26; H04N 7/12

(56) References Cited

U.S. PATENT DOCUMENTS

2002/0037048 A1   3/2002   Radha et al.

OTHER PUBLICATIONS

"Motion–Compensation Fine–Granular–Scalability (MC–FGS) for Wireless Multimedia", van der Schaar et al, IEEE Multimedia Signal Processing IEEE Symposium on, Oct. 3, 2001, pp. 453–458.

"Adaptive Frequency Weighting for Fine–Granularity–Scalability", Peng et al, Proceedings of the Spie, vol. 4671, Jan. 21, 2002, pp. 840–849.

Primary Examiner—Young Lee

(57) ABSTRACT

A method and apparatus for minimizing prediction drift at low bitrates in a fine granular scalable video coding scheme that utilizes motion compensation in an enhancement layer. The method and apparatus measures motion activity within at least a portion a video; determines whether the measured motion activity is below a predetermined threshold value; codes the portion of the video with the fine granular scalable video coding scheme that utilizes motion compensation in the enhancement layer if the measured motion activity is below the predetermined threshold value; and codes the portion of the video with a fine granular scalable video coding that does not utilize motion compensation in the enhancement layer if the measured motion activity is above the predetermined threshold value.

10 Claims, 6 Drawing Sheets

MINIMIZING DRIFT IN MOTION-COMPENSATION FINE GRANULAR SCALABLE STRUCTURES

RELATED APPLICATIONS

Commonly-assigned, copending U.S. patent application Ser. No. 09/887,756, entitled "Single-Loop Motion-Compensation Fine Granular Scalability Structures", filed Jun. 22, 2001.

FIELD OF THE INVENTION

The present invention relates to scalable video coding, and more particularly to a method and apparatus for minimizing prediction drift at low bitrates in motion-compensated fine granular scalable video coding schemes that utilize motion compensation in the enhancement layer. The method and apparatus minimizes prediction drift using a motion-based switching technique that switches between the motion-compensated fine granular scalable coding scheme and a fine granular scalable video coding scheme.

BACKGROUND OF THE INVENTION

Scalable video coding schemes have been used for compressing video transmitted over computer networks with varying bandwidths, such as the Internet. One well known type of scalable video coding scheme is fine granular scalable (FGS) coding. The FGS video coding scheme has been adopted by the ISO MPEG-4 standard as the core video coding method for the MPEG-4 Streaming Video Profile.

As shown in FIG. 1, the FGS video coding scheme, hereinafter referred to as FGS, includes a prediction-based base layer 10 coded at a bitrate $R_{BL}$ and a single enhancement layer 11 coded using a fine-granular scalable (or embedded) coding scheme to a maximum bitrate of $R_{EL}$.

The FGS video coding scheme of FIG. 1 is very flexible because it does not use motion-compensation in the enhancement layer 11. Thus, each enhancement layer frame can be truncated depending upon the available bandwidth at transmission time. However, the lack of motion-compensation in the enhancement layer 11 decreases the image quality of the video.

FIG. 2 shows an improved FGS coding scheme that uses motion-compensation in the enhancement layer to improve the image quality of the video. This improved FGS coding scheme is hereinafter referred to as MC-FGS video coding, is described in U.S. patent application Ser. No. 09/887,756 entitled SINGLE-LOOP MOTION-COMPENSATION FINE GRANULAR SCALABILITY filed on Jun. 22, 2001 by the assignee herein, the entire disclosure of which is incorporated herein by reference.

The MC-FGS video coding scheme of FIG. 2 also includes a prediction-based base layer 20 coded at a bitrate $R_b$ and a single enhancement layer 21 coded using a fine-granular scalable (or embedded) coding scheme to a maximum bitrate of $R_e$. However, unlike the FGS coding scheme, where the P and B base layer frames are predicted from base layer I and P reference frames, the P and B frames of the base layer 20 of the MC-FGS coding scheme are predicted from motion-compensated "extended" or "enhanced" base layer I and P reference frames (hereinafter extended base layer reference frames) during base layer coding. Each motion-compensated extended base layer reference frame comprises data from a standard base layer reference frame, data from at least a portion of an associated enhancement layer reference frame (one or more bitplanes or fractional bit-planes of the associated enhancement layer reference frame can be used), and motion estimation data.

FIG. 3 graphically compares the performances of the FGS and MC-FGS video coding schemes. As can be seen, the MC-FGS video coding scheme has higher peak signal-to-noise ratio (PSNR) values, (PSNR is a measure of quality for each frame) than the FGS video coding scheme at higher bitrates, i.e., bitrates above about 280 kbit/s in FIG. 3. However, at the lower bitrates, i.e., below about 280 kbit/s in FIG. 3, the FGS coding scheme outperforms the MC-FGS coding scheme because of introduced prediction drift in MC-FGS coding scheme. This drift is caused by the use of enhancement layer frame data in the motion-compensation prediction of the base layer P and B frames. Since enhancement layer frame data is only available at the decoder at bitrates greater than $R_{BL}$, prediction drift will occur in the MC-FGS coding scheme at the lower bit-rates where this enhancement layer data is not available.

Accordingly, there is a need for an MC-FGS video coding scheme that has reduced prediction drift at low bitrates.

SUMMARY OF THE INVENTION

The present invention is directed to minimizing prediction drift at low bitrates in a fine granular scalable video coding scheme that utilizes motion compensation in an enhancement layer. The invention involves measuring motion activity within at least a portion a video; determining whether the measured motion activity is below a predetermined threshold value; coding the portion of the video with the fine granular scalable video coding scheme that utilizes motion compensation in the enhancement layer if the measured motion activity is below the predetermined threshold value; and coding the portion of the video with a fine granular scalable video coding that does not utilize motion compensation in the enhancement layer if the measured motion activity is above the predetermined threshold value.

BRIEF DESCRIPTION OF THE DRAWINGS

The advantages, nature, and various additional features of the invention will appear more fully upon consideration of the illustrative embodiments now to be described in detail in connection with accompanying drawings where like reference numerals identify like elements throughout the drawings.

DETAILED DESCRIPTION OF THE INVENTION

In the present invention, prediction drift at low bitrates is minimized in the MC-FGS video coding scheme, as disclosed in the earlier mentioned U.S. patent application Ser. No. 09/887,756, while preserving the coding scheme's high coding efficiency at high bitrates, by switching between MC-FGS coding and FGS coding. Switching is performed according to the amount of motion activity in the subject video sequence or portion thereof. This motion-based switching method originates from four observations about MC-FGS and FGS video coding. The first observation is that in high-motion video sequences at high bitrates, MC-FGS video coding only marginally outperforms FGS video coding. The second observation is that in high-motion video sequences at low bitrates, MC-FGS has significant prediction drift. The third observation is that in low-motion video sequences at high bitrates, MC-FGS video coding substantially outperforms FGS video coding. The fourth and final observation is that in low-motion video sequences at low bitrates, MC-FGS exhibits acceptable prediction drift. Accordingly, MC-FGS video coding is utilized in the present invention for video sequences or portions thereof that include low motion activity while FGS video coding is used for high motion activity video sequences or portions thereof.

Figure 1:
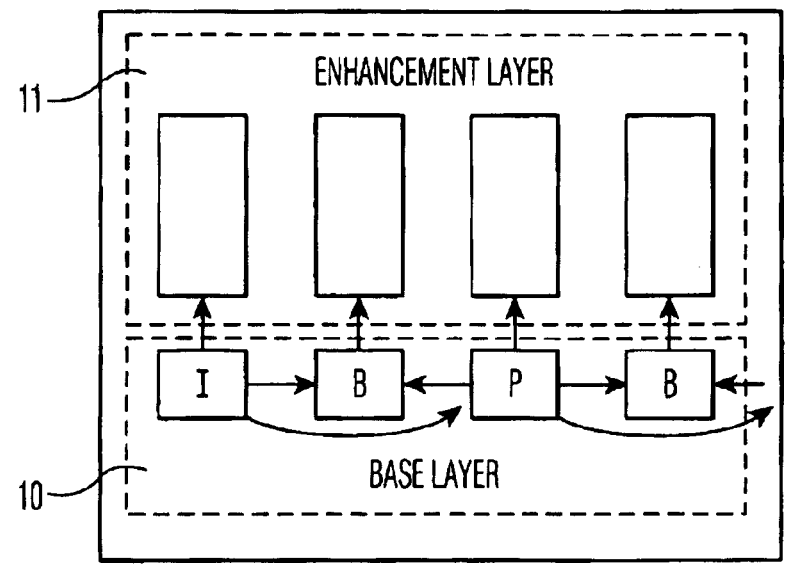
FIG. 1 shows an FGS video coding scheme.
Figure 2:
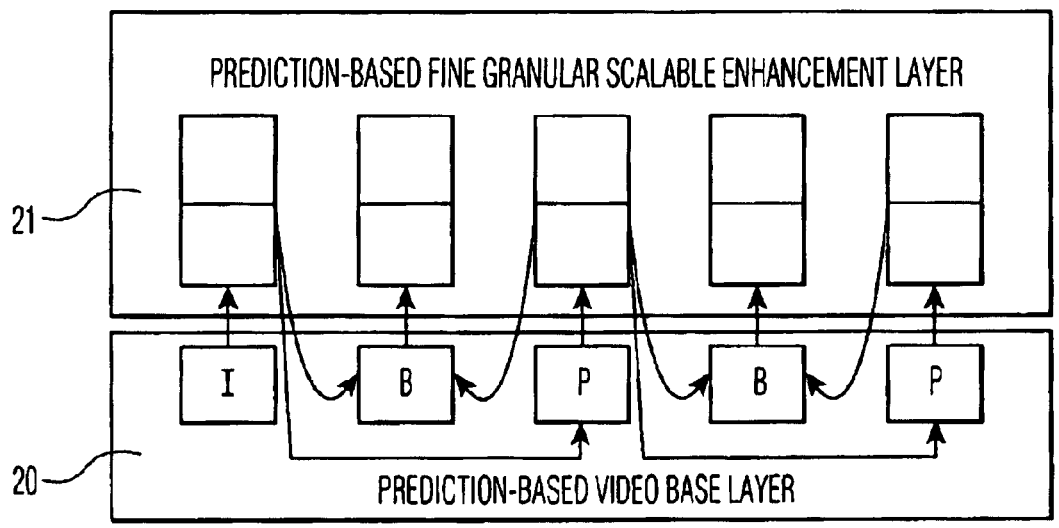
FIG. 2 shows a MC-FGS video coding scheme.
Figure 3:
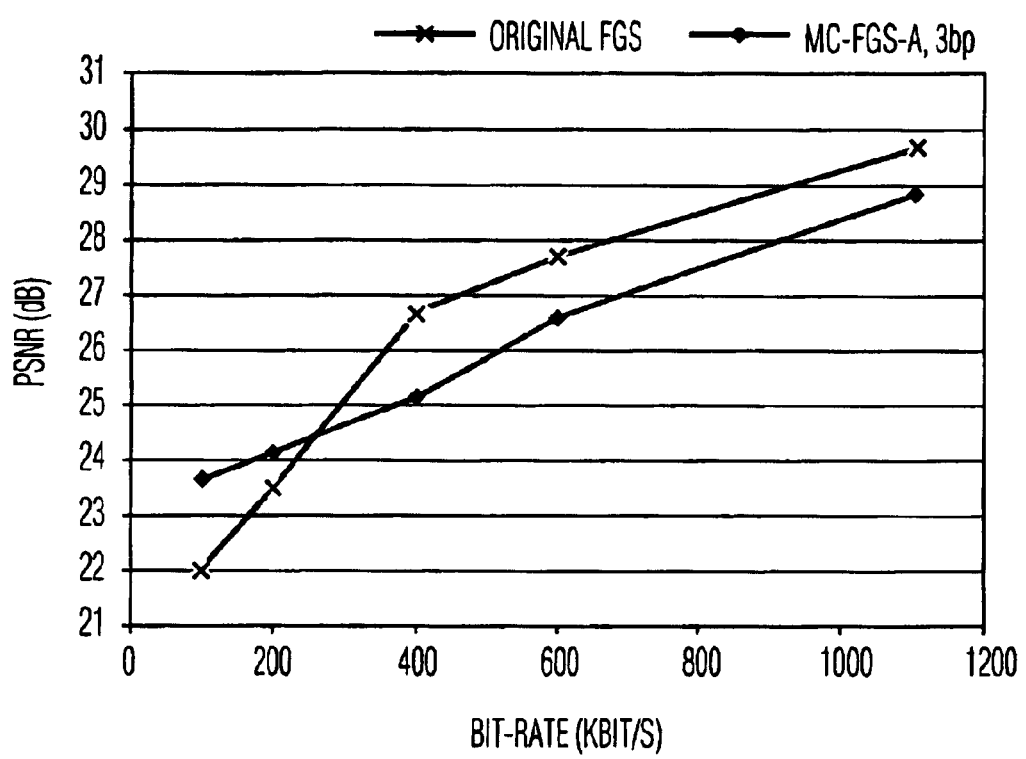
FIG. 3 is a graph that compares the performances of the FGS and MC-FGS video coding schemes.
Figure 4:
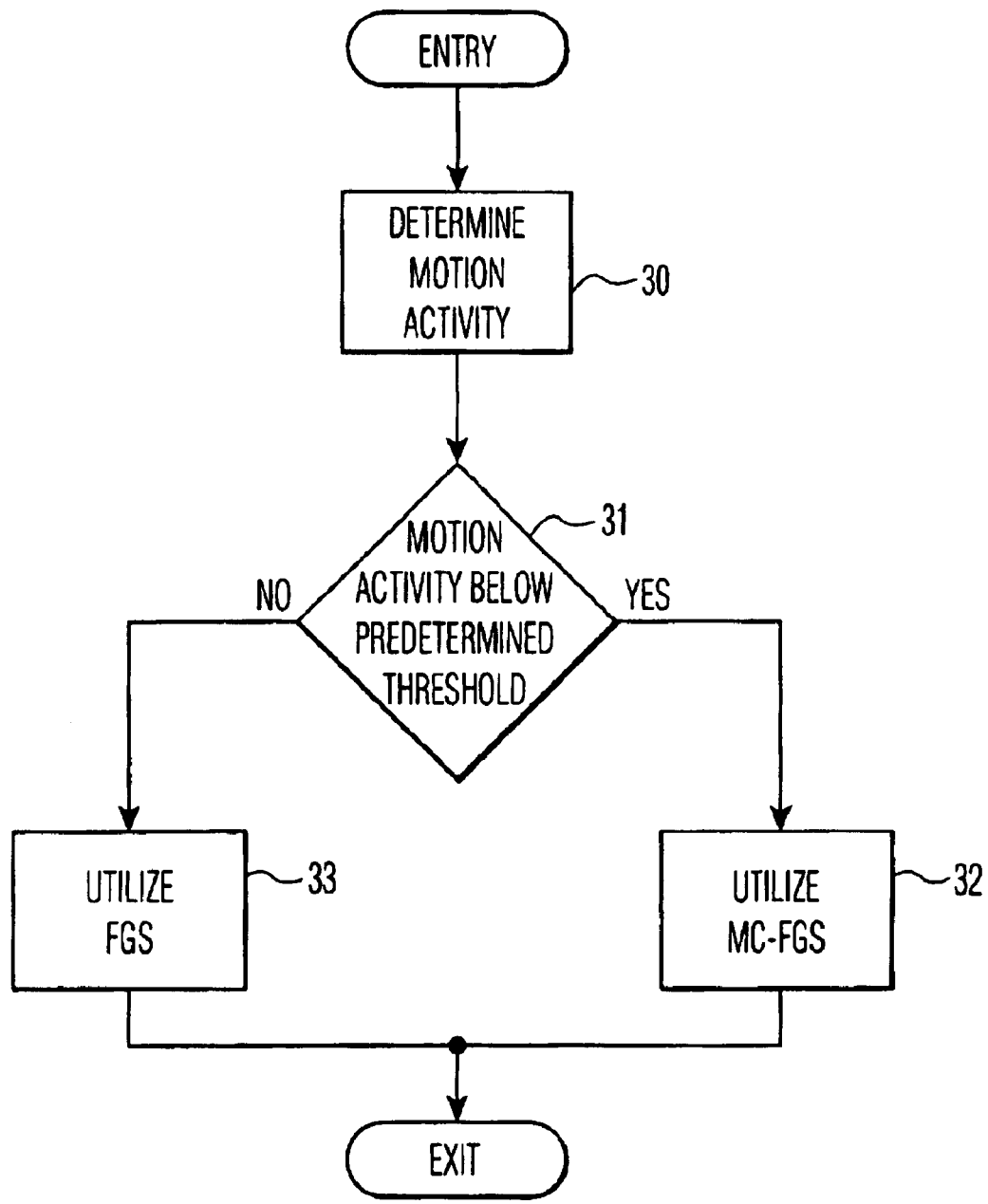
FIG. 4 shows a block-diagram a flow chart that illustrates the switching method of the present invention.

FIG. 4 shows a flow chart that illustrates the switching method of the present invention. At block 30, the amount of motion activity within a portion or an entire sequence of a video is measured. Motion activity may be determined using motion vectors or motion-information data computed at the base layer. At block 31, a determination is made as to whether the amount of motion activity measured in block 30 is below a predetermined threshold value. If the amount of motion activity measured at block 30 is below the predetermined threshold value, the MC-FGS video coding scheme is utilized in block 32. If the amount of motion activity measured at block 30 is above the predetermined threshold value, the FGS video coding scheme is utilized in block 33.

Figure 5:
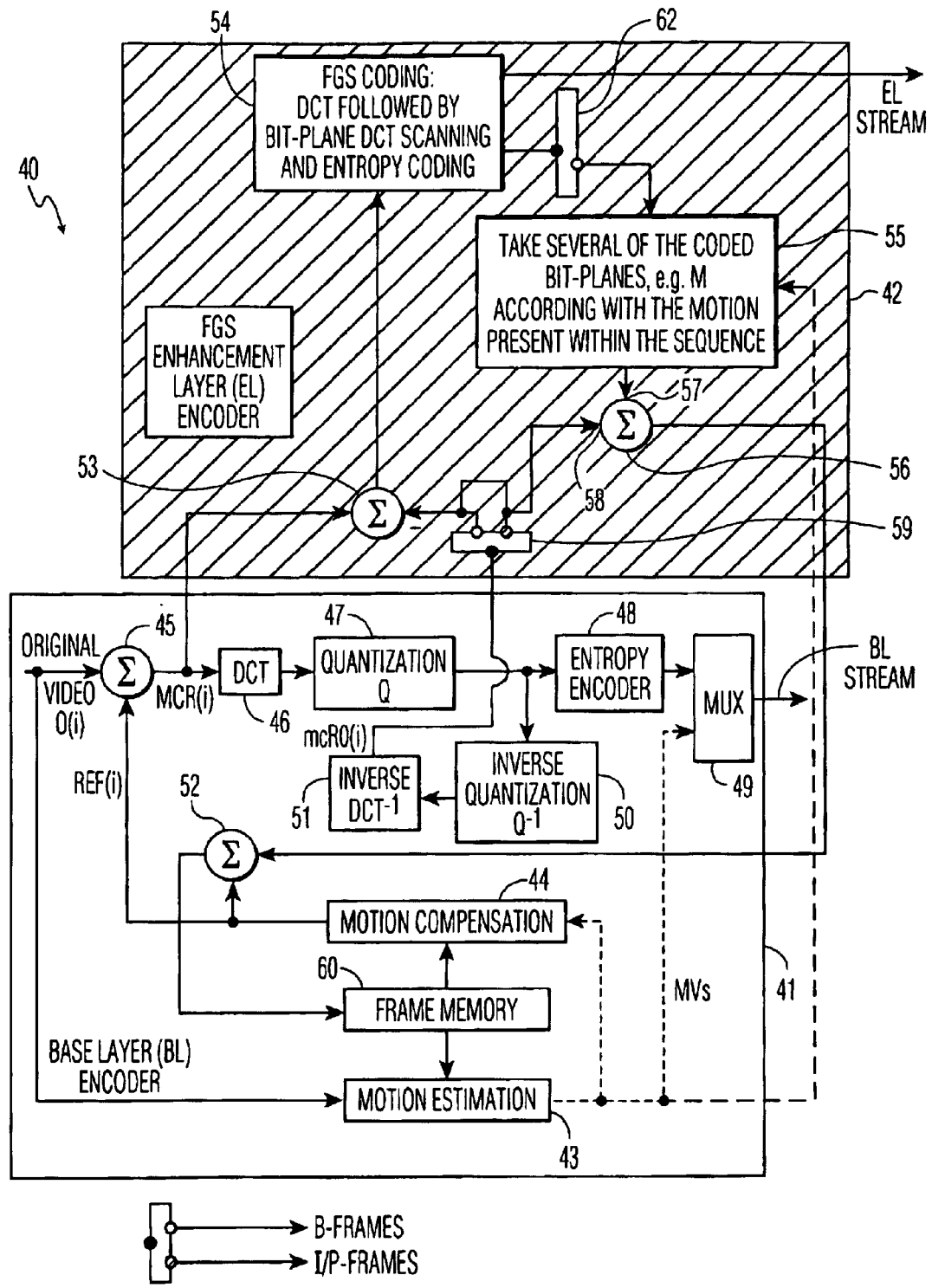
FIG. 5 shows a block-diagram of an exemplary MC-FGS encoder 40 that incorporates the prediction drift reduction principles of the present invention.

FIG. 5 shows a block-diagram of an exemplary MC-FGS encoder 40 that incorporates the prediction drift reduction principles of the present invention. The MC-FGS encoder 40 is constructed to operate in either an MC-FGS mode or an FGS mode, depending upon the amount of motion-activity that is detected in the video sequence or portion thereof. The encoder 40 shown therein includes a base layer encoder 41 and an enhancement layer encoder 42.

The base layer encoder 41 includes a motion estimator 43 that generates motion information (motion vectors and prediction modes) from the original video sequence and reference frames stored in frame memory 60. This motion information is applied to a motion compensator 44 that, in the MC-FGS video coding mode, generates motion-compensated extended base layer I and P reference frames Ref(i) using the motion information and extended base layer I and P reference frames stored in the frame memory 60. In the FGS video coding mode, the motion compensator 44 generates motion-compensated base layer I and P reference frames Ref(i) using the motion information and standard base layer I and P reference frames stored in the frame memory 60. A first subtractor 45 subtracts the motion-compensated extended base layer I and P reference frames Ref(i) (MC-FGS mode), or the motion-compensated standard base layer I and P references frames Ref(i) (FGS mode) from the original video sequence to generate motion-compensated residuals of base layer P and B frames MCR(i). (As is well known in the art, there is no subtraction involving the I frames, because they are not motion-compensated.) The motion-compensated residuals of the base layer P and B frames, and the I frames are processed by a discrete cosine transform (DCT) encoder 46, a quantizer 47, and an entropy encoder 48 to generate base layer I-, P-, and B-frames, which form a portion of a compressed base layer stream. The motion information generated by the motion estimator 43 is also applied to a multiplexer 49, which combines the motion information with the base layer I-, P-, and B-frames to complete the compressed base layer stream. The quantized motion-compensated residuals of the base layer I, P and B frames MCR(i) generated at the output of the quantizer 47 are dequantized by an inverse quantizer 50, and then decoded by an inverse DCT decoder 51. This process generates quantized/dequantized versions of the motion-compensated residuals of the base layer I, P and B frames MCRQ(i) at the output of the inverse DCT 51.

The enhancement layer encoder 42 includes a second subtractor 53 which receives the quantized/dequantized motion-compensated residuals of the base layer I, P, and B frames from the base layer encoder 41, via a first frame flow control device 59. The second subtractor 53 subtracts the quantized/dequantized motion-compensated residuals of the base layer I, P and B frames MCRQ(i) from the corresponding motion-compensated residuals of the base layer I, P and B frames MCR(i) to generate differential I, P and B frame residuals. The output of the second subtractor 53 is fine granular scalable coded by an FGS encoder 54 or any other encoder capable of fine granular scalable coding. The FGS encoder 54 may use conventional DCT encoding followed by conventional bit-plane DCT scanning and conventional entropy encoding to generate a compressed enhancement layer stream of I, P and B enhancement layer frames.

A masking device 55 reuses the motion information generated by the motion estimator 43 and performs the method illustrated in FIG. 4. If the level of motion activity dictates the selection of the MC-FGS mode, the masking device 55 takes one or more of the coded bit planes of the scalable coded I and P enhancement layer frames selectively received through a second frame flow control device 62, and applies this data to a first input 57 of a first adder 56. The quantized/dequantized versions of the motion-compensated residuals of the base layer I and P frames MCRQ(i) are routed by the first frame flow control device 59 to a second input 58 of the first adder 56. The first adder 56 generates enhancement layer I and P reference frames by summing the one or more coded bit planes of the scalable encoded I and P enhancement layer frames with respective quantized/dequantized motion-compensated residuals of the base layer I and P frames MCRQ(i). The enhancement layer I and P reference frames outputted by the first adder 56 are directed to a second adder 52. The second adder 52 sums the enhancement layer I and P reference frames with motion-compensated reference frames Ref(i) to generate new motion-compensated extended base layer I and P reference frames, which are stored in the frame memory 60 and used as described earlier for predicting the base layer P and B frames.

If the level of motion activity dictates the selection of the FGS mode, no coded bit planes of the scalable coded I and P enhancement layer frames are applied by the masking device 55 to the first input 57 of the first adder 56. However, the quantized/dequantized versions of the motion-compensated residuals of the base layer I and P frames MCRQ(i) are routed by the first frame flow control device 59 to the second input 58 of the first adder 56 which passes this data to the second adder 52. The second adder 52 sums the motion-compensated residuals of the base layer I and P frames MCRQ(i) with motion-compensated reference frames Ref(i) to generate the new motion-compensated base layer I and P reference frames, which are stored in the frame memory 60 and used for predicting the base layer P and B frames.

Figure 6:
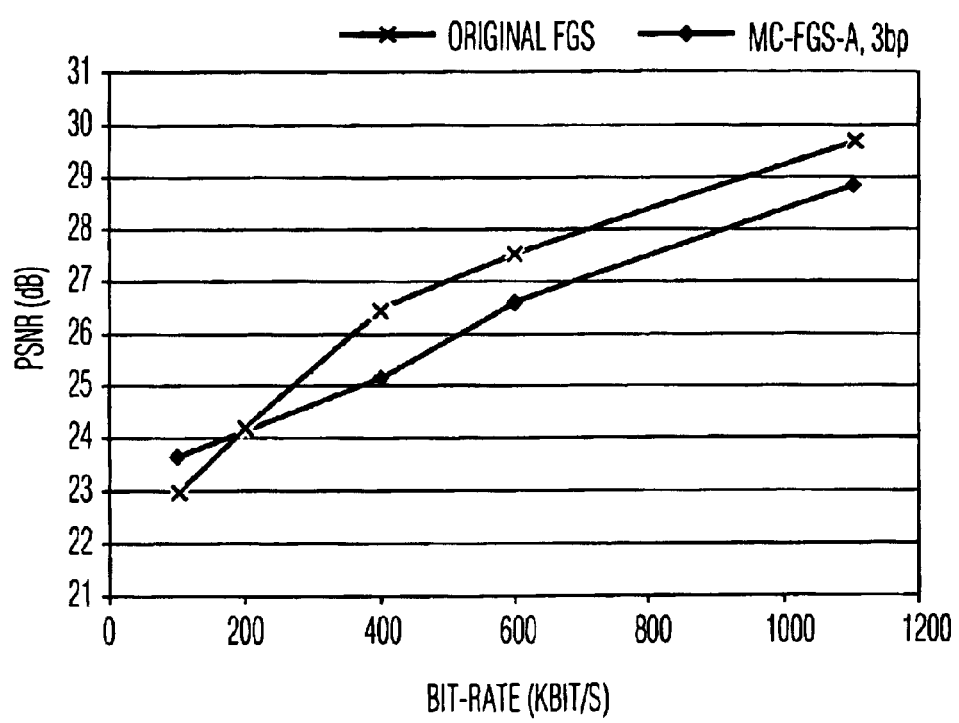
FIG. 6 is a graph that compares the performance of the MC-FGS encoding scheme using the prediction-drift reducing principles of the present invention to the FGS coding scheme.

FIG. 6 graphically compares the performance of the MC-FGS encoding scheme using the prediction-drift reducing principles of the present invention to the FGS coding scheme. As can be seen, the MC-FGS video coding scheme with prediction drift has higher PSNR values than the FGS video coding scheme at bitrates above about 200 kbit/s.

Figure 7:
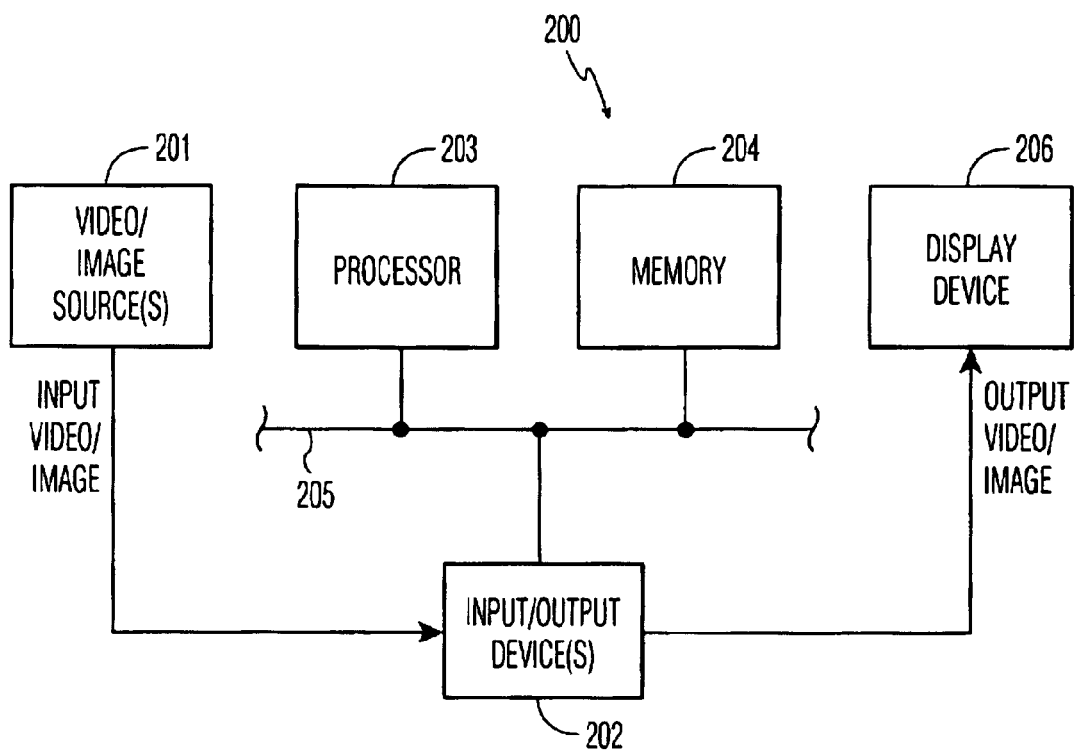
FIG. 7 shows an exemplary embodiment of a system which may be used for implementing the principles of the present invention.

FIG. 7 shows an exemplary embodiment of a system 200 which may use the encoder that embodies the principles of the present invention. The system 200 may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. The system 200 includes one or more video/image sources 201, one or more input/output devices 202, a processor 203 and a memory 204. The video/image source(s) 201 may represent, e.g., a television receiver, a VCR or other video/image storage device. The source(s) 201 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 202, processor 203 and memory 204 may communicate over a communication medium 205. The communication medium 205 may represent, e.g., a bus, a communication network, one or more internal connections of a circuit, circuit card or other device, as well as portions and combinations of these and other communication media. Input video data from the source(s) 201 is processed in accordance with one or more software programs stored in memory 204 and executed by processor 203 in order to generate output video/images supplied to a display device 206.

In a preferred embodiment, the encoding principles of the present invention may be implemented by computer readable code executed by the system. The code may be stored in the memory 204 or read/downloaded from a memory medium such as a CD-ROM or floppy disk. In other embodiments, hardware circuitry may be used in place of, or in combination with, software instructions to implement the invention. For example, the elements shown in FIG. 5 may also be implemented as discrete hardware elements.

While the present invention has been described above in terms of specific embodiments, it is to be understood that the invention is not intended to be confined or limited to the embodiments disclosed herein. For example, other transforms besides DCT can be employed, including but not limited to wavelets or matching-pursuits. These and all other such modifications and changes are considered to be within the scope of the appended claims.

What is claimed is:

1. A method for minimizing prediction drift in a fine granular scalable video coding scheme that utilizes motion compensation in an enhancement layer, the method comprising:
   measuring motion activity within at least a portion of a video;
   determining whether the measured motion activity is below a predetermined threshold value;
   coding the portion of the video with the fine granular scalable video coding scheme that utilizes motion compensation in the enhancement layer if the measured motion activity is below the predetermined threshold value; and
   coding the portion of the video with a fine granular scalable video coding that does not utilize motion compensation in the enhancement layer if the measured motion activity is above the predetermined threshold value.

2. The method according to claim 1, wherein the measuring step is performed using motion data computed during base layer encoding.

3. An apparatus for coding video, the apparatus comprising:
   means for measuring motion activity within at least a portion of a video;
   means for determining whether the measured motion activity is below a predetermined threshold value;
   means for coding the portion of the video with a fine granular scalable video coding scheme that utilizes motion compensation in an enhancement layer if the measured motion activity is below the predetermined threshold value; and
   means for coding the portion of the video with a fine granular scalable video coding that does not utilize motion compensation in an enhancement layer if the measured motion activity is above the predetermined threshold value.

4. The apparatus according to claim 3, wherein the measuring means uses motion data computed during base layer encoding.

5. A method for coding video, the method comprising:
   measuring motion activity within at least a portion of a video;
   determining whether the measured motion activity is below a predetermined threshold value;
   coding the portion of the video with a fine granular scalable video coding scheme that utilizes motion compensation in an enhancement layer if the measured motion activity is below the predetermined threshold value; and
   coding the portion of the video with a fine granular scalable video coding that does not utilize motion compensation in an enhancement layer if the measured motion activity is above the predetermined threshold value.

6. The method according to claim 5, wherein the measuring step is performed using motion data computed during base layer encoding.

7. A memory medium for encoding video, the memory medium comprising:
   code for measuring motion activity within at least a portion of a video;
   code for determining whether the measured motion activity is below a predetermined threshold value;
   code for coding the portion of the video with a fine granular scalable video coding scheme that utilizes motion compensation in an enhancement layer if the measured motion activity is below the predetermined threshold value; and
   code for coding the portion of the video with a fine granular scalable video coding that does not utilize motion compensation in an enhancement layer if the measured motion activity is above the predetermined threshold value.

8. The memory medium according to claim 7, wherein the code for measuring motion activity use motion data computed during base layer encoding.

9. A coded data signal produced by the steps comprising:

measuring motion activity within at least a portion of a video;

determining whether the measured motion activity is below a predetermined threshold value;

coding the portion of the video with a fine granular scalable video coding scheme that utilizes motion compensation in an enhancement layer if the measured motion activity is below the predetermined threshold value; and coding the portion of the video with a fine granular scalable video coding that does not utilize motion compensation in the enhancement layer if the measured motion activity is above the predetermined threshold value.

10. The coded data signal according to claim 9, wherein the measuring step is performed using motion data computed during base layer encoding.

* * * * *